United States Patent
Ochi

(10) Patent No.: US 7,161,127 B2
(45) Date of Patent: Jan. 9, 2007

(54) AUTOMATIC FOCUSING APPARATUS AND AUTOMATIC FOCUSING METHOD USING AN INDEX VALUE BASED ON BACKGROUND COLOR INFORMATION

(75) Inventor: Hirotaka Ochi, Saijyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/057,688

(22) Filed: Feb. 8, 2005

(65) Prior Publication Data

US 2005/0236552 A1 Oct. 27, 2005

(30) Foreign Application Priority Data

Feb. 9, 2004 (JP) .............................. 2004-031774

(51) Int. Cl.
*G02B 7/04* (2006.01)
*G03B 13/00* (2006.01)

(52) U.S. Cl. ................... 250/201.2; 348/349

(58) Field of Classification Search ............ 250/201.7, 250/201.3, 201.1, 201.2, 201.4, 201.8, 226; 348/353, 354, 272, 273, 345, 347, 349, 350, 348/355, 356; 396/79, 80
See application file for complete search history.

(56) References Cited

U.S. PATENT DOCUMENTS 4,471,305 A * 9/1984 Crooks et al. .............. 324/309

6,525,763 B1 * 2/2003 Maeda ......................... 348/96

FOREIGN PATENT DOCUMENTS

| JP | 10-042184 | 2/1998 |
|----|-----------|--------|
| JP | 2001-154269 | 6/2001 |

* cited by examiner

*Primary Examiner*—Georgia Epps
*Assistant Examiner*—Pascal M. Bui-Pho
(74) *Attorney, Agent, or Firm*—Wenderoth, Lind & Ponack, L.L.P.

(57) ABSTRACT

An automatic focusing apparatus includes a photographing unit for photographing a transmitted light generated by applying a light to an observation target from a light source and an index value operation unit for operating to obtain an index value indicating focus information for the observation target from the image data outputted from the photographing unit. The automatic focusing apparatus also includes a focus controller for controlling a focus of the photographing unit so as to obtain an optimal focus position for the observation target on the basis of the index value, and uses a threshold value obtained from a background color of the image data to discriminate between the observation target and dust, thereby enabling proper automatic focusing on the target to observed even from the image data having the observation target and dust mixed.

15 Claims, 9 Drawing Sheets

Fig.2(a) image
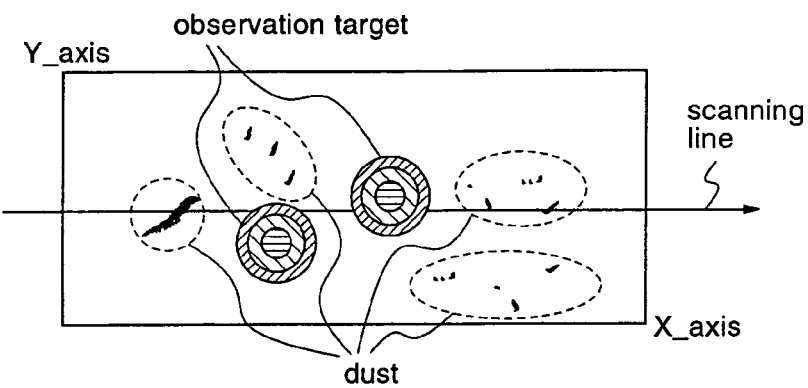
Fig.2(b) image data on scanning line
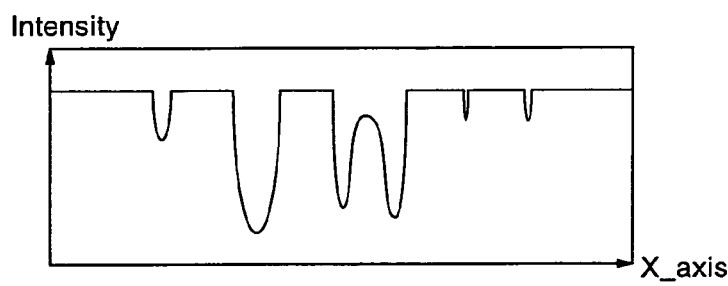
Fig.2(c) clip unit output
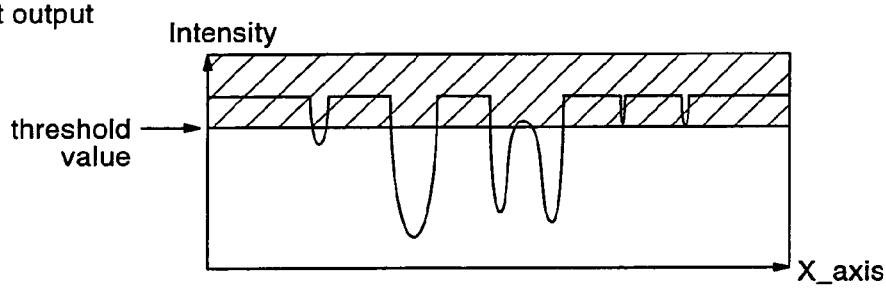
Fig.2(d) high-pass filter output
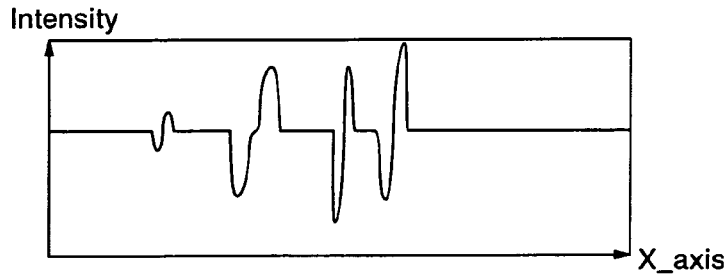
Fig.2(e) rectifier output
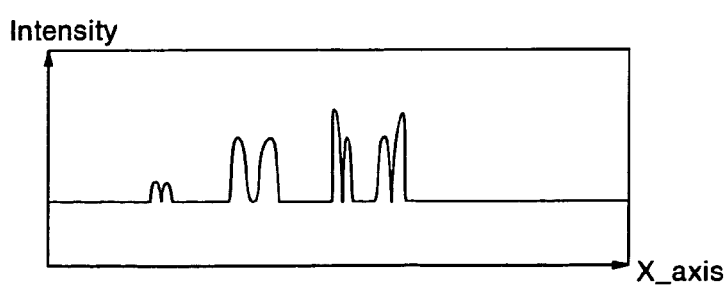

histogram of image dust component in histogram of image component of observation target in histogram of image background component in histogram of image threshold value = background color × n
n is an arbitrary value image which is
divided into areas histogram for A1 histogram for A2 histogram for B3 a case where there is dust and no clipping is performed a case where there is dust and clipping is performed a position at which dust is in focus a position at which observation target is in focus

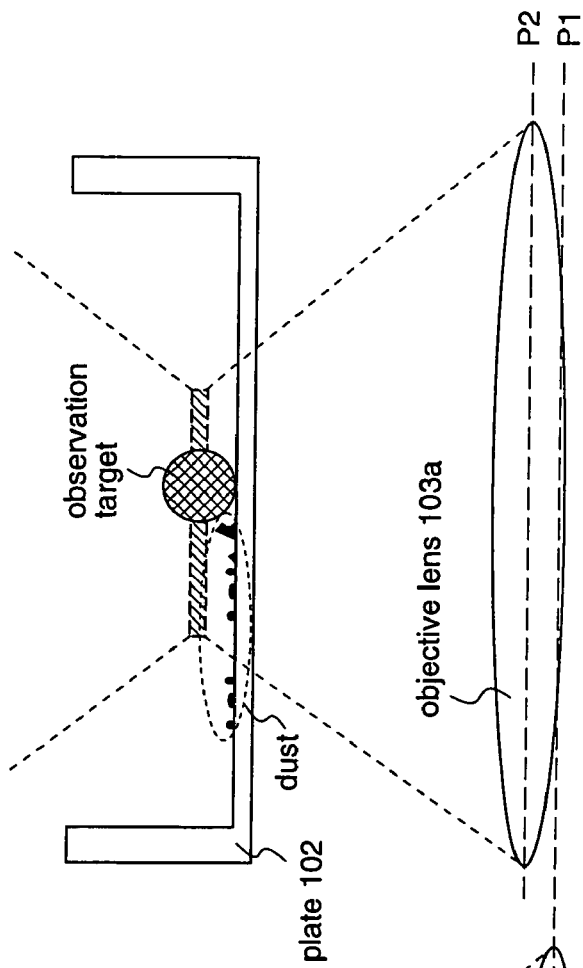

a case where there is dust and no clipping is performed a case where there is dust and clipping is performed a position at which dust is in focus a position at which observation target is in focus

AUTOMATIC FOCUSING APPARATUS AND AUTOMATIC FOCUSING METHOD USING AN INDEX VALUE BASED ON BACKGROUND COLOR INFORMATION

FIELD OF THE INVENTION

The present invention relates to an automatic focusing apparatus and image processing system, and specifically to an automatic focusing apparatus and automatic focusing method using a transmitted light.

BACKGROUND OF THE INVENTION

In order to check to what degree an image of a camera is in focus, a prior art automatic focusing apparatus enhances the high frequency of image data which is photographed by the camera using a high-pass filter, determines a focus position on the basis of an index value obtained by averaging an absolute value of an output value of the high-pass filter or the square of the output value, and moves the objective lens to the determined focus position, thereby performing the automatic focusing operation (for example, refer to Japanese Published Patent Application No. Hei.10-042184, pages 3 to 7 and FIG. 1).

Particularly, a microscope for making a precise analysis, and the like are required to be properly focused on an observation target.

However, there is some cases where an influence of a noise such as a dust makes it difficult to automatically bring the observation target into focus properly in the above-described prior art.

Then, as an automatic focusing method for reducing the influence of the noise, in a case where an automatic focusing is performed using a transmitted light, suggested is a method in which a range in which the automatic focusing is performed is restricted to a range in which the observation target is present in a full field of view which is photographed by a camera, and only the image data in the range is used as an operation target for the automatic focusing.

FIG. 9 is a diagram illustrating a construction of a prior art automatic focusing apparatus.

An automatic focusing apparatus shown in FIG. 9 comprises a light source 901, a film 902, a lens unit 903, an image sensor 904, an A/D converter 905, an operation unit 906, a controller 907, a range designating unit 908, a stepping motor 909, and a sensor driving unit 910.

The light source 901 applies a light to the film 902.

The lens unit 903 performs zooming and focusing with respect to the image photographed on the film 902. The lens unit 903 is controlled as to movement by being driven by the stepping motor 909.

The image sensor 904 is a solid-state image sensor provided on an image forming surface in the lens unit 903, and reads a film image. The image sensor 904 is controlled as to movement by being driven by the sensor driving unit 910.

The A/D converter 905 subjects the image data read by the image sensor 904 to A/D conversion.

The operation unit 906 performs an operation to obtain a focus value for the A/D converted image data.

The controller 907 controls the stepping motor 909 and the sensor driving unit 910 on the basis of the output from the range designating unit 908 and the output from the operation unit 906.

The range designating unit 908 previously designates a range of image.

An operation of the automatic focusing apparatus so constructed will be described.

Initially, the light source 901 applies a light to the film 902, and the image sensor 904 reads a transmitted light through the lens unit 903.

Then, the A/D converter 905 quantizes the image data outputted from the image sensor 904. The controller 907 controls the stepping motor 909 for driving the lens unit 903 and the sensor driving unit 910 for driving the image sensor 904 on the basis of the output signal, from the operation unit 906 and the output signal from the range designating unit 908.

The automatic focusing is executed using image data in a range previously designated by the range designating unit 908, in which an effective image is more likely to be present and thereby an optimal focus position is obtained by the operation unit 906 (for example, refer to Japanese Published Patent Application No. 2001-154269, page 18 and FIG. 7).

In the above-described prior art automatic focusing apparatus, however, there is a problem that since a range in which the automatic focusing is performed is restricted to a periphery of an observation target, in a case where the observation target and dust and the like are mixedly present, it is difficult to set the range, and thereby it is impossible to properly perform automatic focusing even when the observation target is sufficiently larger than the dust and the like.

SUMMARY OF THE INVENTION

The present invention is made to solve the above-described problems and has for its object to provide an automatic focusing apparatus and automatic focusing method for enabling reliable and high-speed automatic focusing even when an observation target, dust and the like are mixedly present.

Other objects and advantages of the invention will become apparent from the detailed description that follows. The detailed description and specific embodiments described are provided only for illustration since various additions and modifications within the spirit and scope of the invention will be apparent to those of skill in the art from the detailed description.

In order to solve the above-described problems of the prior art, according to a 1st aspect of the present invention, there is provided an automatic focusing apparatus which comprises: a light source for applying a light to an observation target; a photographing unit for photographing a transmitted light generated by applying the light to the observation target from the light source and outputting the photographed light as image data; an index value operation unit for obtaining background color information from the image data outputted from the photographing unit and performing an operation to obtain an index value indicating focus information for the observation target on the basis of the background color information; and a focus controller for controlling the focus of the photographing unit so as to obtain an optimal focus position for the observation target on the basis of the index value.

Therefore, the automatic focusing apparatus which can perform proper automatic focusing even when dust and the like are mixed into the observation target can be provided.

According to a 2nd aspect of the present invention, in the automatic focusing apparatus of the 1st aspect, the index value operation unit comprises: a background color operation unit for obtaining the background color information from the image data; a threshold value operation unit for obtaining a threshold value for the image data on the basis of the background color information; a clip unit for subjecting the image data to clipping processing using the threshold value; a high-pass filter for extracting high frequency components of the image data from the output signal of the clip unit; and an operation unit for obtaining the index value on the basis of the high-pass filter output signal.

Therefore, the discrimination between the observation target and the dust can be easily performed on the basis of the background color information, and even when dust and the like are mixed into the observation target, the proper automatic focusing can be performed without being affected by the influence of the dust.

According to a 3rd aspect of the present invention, in the automatic focusing apparatus of the 1st aspect, the index value operation unit comprises: a background color operation unit for obtaining the background color information from the image data; a threshold value operation unit for obtaining a threshold value for the image data on the basis of the background color information; a clip unit for subjecting the image data to clipping processing using the threshold value; a selection unit for selecting one of the image data and the image data which is subjected to the clipping processing by the clip unit and outputting the selected one; a high-pass filter for extracting high frequency components of the image data from the output signal of the selection unit; and an operation unit for obtaining the index value on the basis of the high-pass filter output signal.

Therefore, the discrimination between the observation target and the dust can be easily performed on the basis of the background color information, and even when dust and the like are mixed into the observation target, the proper automatic focusing can be performed without receiving the influence of the dust.

According to a 4th aspect of the present invention, in the automatic focusing apparatus of the 3rd aspect, the focus controller has at least 2 stages of focus control modes of coarse adjustment and fine adjustment, and the selection unit selects the image data when the focus controller makes the coarse adjustment, and selects the image data which is subjected to the clipping processing by the clip unit when the focus controller makes the fine adjustment.

Therefore, even when the observation target and the dust are mixedly present, the proper automatic focusing can be performed.

According to a 5th aspect of the present invention, in the automatic focusing apparatus of the 3rd aspect, the focus controller makes the coarse adjustment and then makes the fine adjustment.

Therefore, a proper focus position can be obtained at higher speed and with higher precision.

According to a 6th aspect of the present invention, in the automatic focusing apparatus of the 2nd or 3rd aspect, the background color operation unit includes a histogram creation unit for creating a histogram of the image data, and outputs an image intensity value corresponding to the largest value in the histogram as the background color information.

Therefore, the background color information can be prevented from being erroneously detected due to the dark current noise of the CCD element and the like, and the influence of the dust can be reduced as much as possible without degrading the performance, thereby enabling the proper automatic focusing to be executed.

According to a 7th aspect of the present invention, in the automatic focusing apparatus of the 2nd or 3rd aspect, the background color operation unit includes a largest value operation unit for obtaining the largest value of the image intensities of the image data, and outputs the largest value of the image intensities obtained by the largest value operation unit as the background color information.

Therefore, the background color information can be prevented from being erroneously detected due to the dark current noise of the CCD element and the like, and the influence of the dust can be reduced as much as possible without degrading the performance, thereby enabling the proper automatic focusing to be executed.

According to an 8th aspect of the present invention, in the automatic focusing apparatus of 2nd or 3rd aspect, the background color operation unit includes an average value operation unit for obtaining an average value of the image intensities of the image data, and outputs the average value of the image intensities obtained by the average value operation unit as the background color information.

Therefore, the background color information can be prevented from being erroneously detected due to the dark current noise of the CCD element and the like, and the influence of the dust can be reduced as much as possible without degrading the performance, thereby enabling the proper automatic focusing to be executed.

According to a 9th aspect of the present invention, in the automatic focusing apparatus of the 2nd or 3rd aspect, the background color operation unit includes an area-specific histogram creation unit for dividing the image data into a plurality of areas and creating a histogram for each area, and outputs the image intensity value corresponding to the largest value in the histogram for each area as the background color information for each area.

Therefore, the background color information can be obtained for each area, and thereby the non-uniformity of the background colors of the whole image data can be coped with. Further, the background color information can be prevented from being erroneously detected due to the dark current noise of the CCD element and the like, and the influence of the dust can be reduced as much as possible without degrading the performance, thereby enabling the observation target to be properly brought into focus.

According to a 10th aspect of the present invention, in the automatic focusing apparatus of 2nd or 3rd aspect, the background color operation unit includes an area-specific largest value operation unit for dividing the image data into a plurality of areas and obtaining the largest value of the image intensities for each area, and outputs the largest value of the image intensities for each area, which is obtained by the area-specific largest value operation unit, as the background color information for each area.

Therefore, the background color information can be obtained for each area, and thereby the non-uniformity of the background colors of the whole image data can be coped with. Further, the background color information can be prevented from being erroneously detected due to the dark current noise of the CCD element and the like, and the influence of the dust can be reduced as much as possible without degrading the performance, thereby enabling the observation target to be properly brought into focus.

According to an 11th aspect of the present invention, in the automatic focusing apparatus of the 10th aspect, the background color operation unit outputs, as the background color information, the smallest image intensity value among the plural largest values of the image intensities, which are obtained by the area-specific largest value operation unit.

Therefore, the non-uniformity of the background colors of the whole image data can be coped with. Further, the background color information can be prevented from being erroneously detected due to the dark current noise of the CCD element and the like, and the influence of the dust can be reduced as much as possible without degrading the performance, thereby enabling the observation target to be properly brought into focus.

According to a 12th aspect of the present invention, in the automatic focusing apparatus of the 2nd or 3rd aspect, the background color operation unit includes an area-specific average value operation unit for dividing the image data into a plurality of areas and obtaining an average value of the image intensities for each area, and outputs the average value of the image intensities for each area, which is obtained by the area-specific average value operation unit, as the background color information for each area.

Therefore, the background color information can be obtained for each area, and thereby the non-uniformity of the background colors of the whole image data can be coped with. Further, the background color information can be prevented from being erroneously detected due to the dark current noise of the CCD element and the like, and the influence of the dust can be reduced as much as possible without degrading the performance, thereby enabling the observation target to be properly brought into focus.

According to a 13th aspect of the present invention, in the automatic focusing apparatus of any of the 1st to 10th aspects, the observation target is of a predetermined size and larger than a noise mixed into the image data.

According to a 14th aspect of the present invention, there is provided an automatic focusing method for photographing a transmitted light generated by applying a light to an observation target using a photographing element and focusing the photographing element on the basis of image data obtained from the photographed image, which comprises: performing an operation to obtain background color information from the image data; performing an operation to obtain a threshold value for the image data on the basis of the background color information; subjecting the image data to clipping processing using the threshold value; extracting high frequency components of the image data which is subjected to the clipping processing; performing operation to obtain an index value indicating focus information for the observation target on the basis of the extracted high frequency components; and controlling the focus of the photographing element so as to obtain an optimal focus position for the observation target on the basis of the index value.

Therefore, even when the observation target and the dust are mixedly present, the observation target can be properly brought into focus.

According to a 15th aspect of the present invention, there is provided an automatic focusing method for photographing a transmitted light generated by applying a light to an observation target using a photographing element and focusing the photographing element on the basis of image data obtained from the photographed image, which comprises: performing an operation to obtain background color information from the image data; performing an operation to obtain a threshold value for the image data on the basis of the background color information; subjecting the image data to clipping processing using the threshold value; extracting high frequency components of the image data or of the data which is subjected to the clipping processing; selecting the high frequency components extracted from the image data when the coarse adjustment is made for focusing the photographing element, and selecting the high frequency components extracted from the image data which is subjected to the clipping processing when the fine adjustment is made for focusing the photographing element and performing an operation to obtain an index value indicating focus information for the observation target on the basis of the selected high frequency components; and controlling the focus of the photographing element so as to obtain an optimal focus position for the observation target on the basis of the index value.

Therefore, even when the observation target and the dust are mixedly present, the observation target can be properly brought into focus at higher speed and with higher precision.

BRIEF DESCRIPTION OF THE DRAWINGS

FIGS. 2(a)–2(e) are diagrams for explaining how to obtain an index value in the automatic focusing apparatus according to the first embodiment, wherein FIG. 2(a) illustrates an example of photographed image, FIG. 2(b) shows intensity of the image data on the scanning line of FIG. 2(a), FIG. 2(c) shows intensity of the image data which is subjected to clipping processing, FIG. 2(d) shows intensity of the image data which is processed by the high-pass filter, and FIG. 2(e) shows intensity of the image data which is rectified.

FIGS. 3(a)–3(d) are diagrams for explaining a method for performing an operation to obtain a background color in the automatic focusing apparatus according to the first embodiment, wherein FIG. 3(a) illustrates an example of a histogram of photographed image, FIG. 3(b) shows components of dust contained in the histogram shown in FIG. 3(a), FIG. 3(c) shows component of the observation target contained in the histogram shown in FIG. 3(a), and FIG. 3(d) shows components of the background contained in the histogram shown in FIG. 3(a).

FIGS. 4(a)–4(d) are diagrams for explaining a method for performing an operation to obtain a background color for each area in the automatic focusing apparatus according to the first embodiment, wherein FIG. 4(a) illustrates an example of a case where photographed image is divided into a plurality of areas, FIG. 4(b) shows a histogram for the area A1, FIG. 4(c) shows a histogram for the area A2, and FIG. 4(d) shows a histogram for the area B3.

FIGS. 5(a) and 5(b) are diagrams for explaining an automatic focusing method performed by the automatic focusing apparatus according to the first embodiment, wherein FIG. 5(a) shows a relationship between the index value and the focus position in the case of no clipping being performed, and FIG. 5(b) shows a relationship between the index value and the focus position in the case of the clipping being performed.

FIGS. 6(a) and 6(b) illustrate an example of a focused position according to the automatic focusing apparatus of the first embodiment, wherein FIG. 6(a) illustrates an example for a case where the dust is in focus and FIG. 6(b) illustrates an example for a case where the observation target is in focus.

FIGS. 8(a) and 8(b) are diagrams for explaining an automatic focusing method performed by the automatic focusing apparatus according to the second embodiment of the present invention, wherein FIG. 8(a) shows a relationship between the index value and the focus position in the case of no clipping being performed and FIG. 8(b) shows a relationship between the index value and the focus position in the case of the clipping being performed.

DETAILED DESCRIPTION OF THE PREFERRED EMBODIMENTS

Hereinafter, embodiments of an automatic focusing apparatus and automatic focusing method according to the present invention will be described in detail with reference to the drawings.

Embodiment 1

Figure 1:
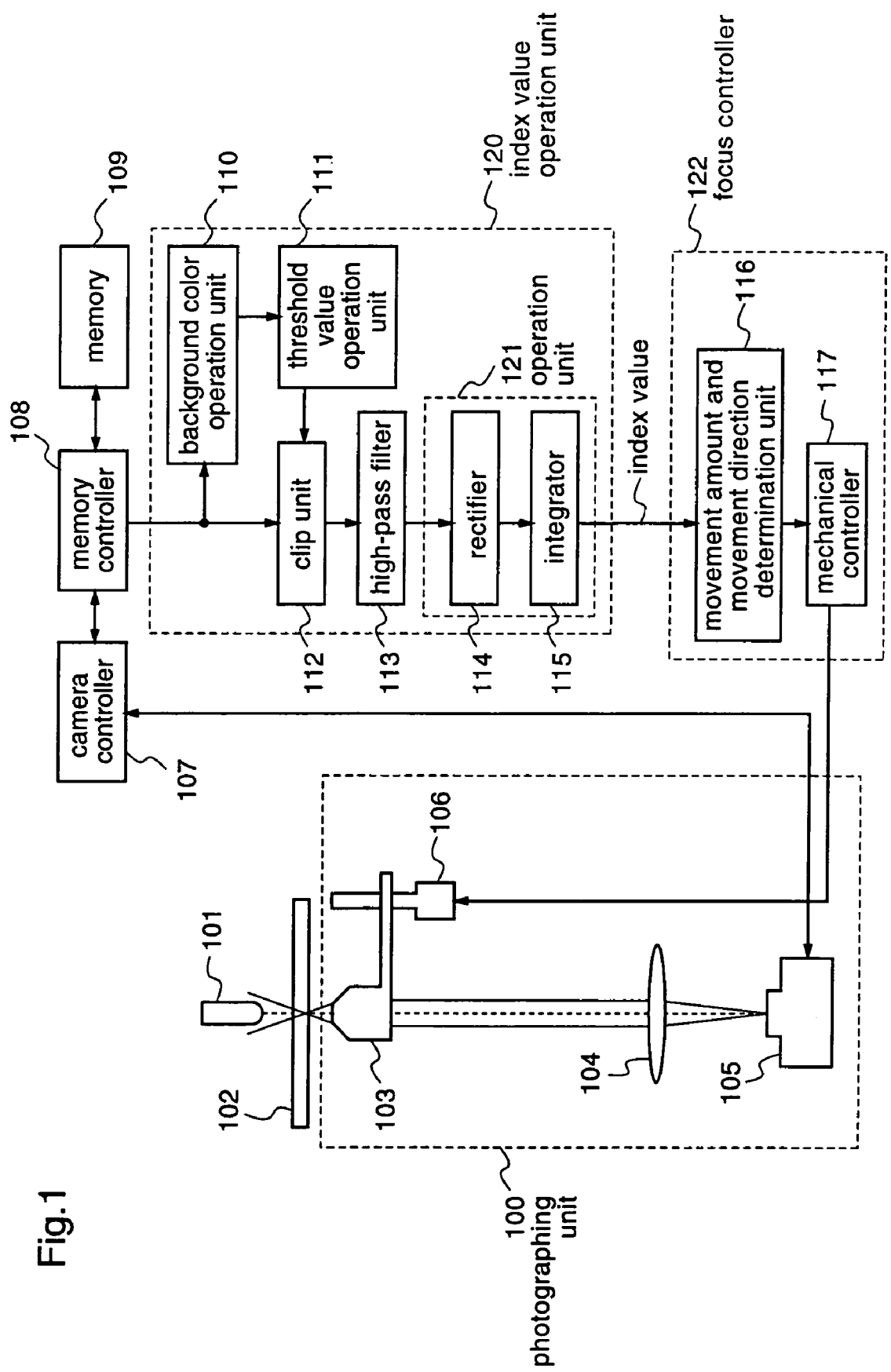
FIG. 1 is a diagram illustrating a construction of an automatic focusing apparatus according to a first embodiment of the present invention.

FIG. 1 is a diagram illustrating a construction of an automatic focusing apparatus according to a first embodiment of the present invention.

The automatic focusing apparatus shown in FIG. 1 comprises a light source 101, a plate 102, a photographing unit 100, a camera controller 107, a memory controller 108, a memory 109, an index value operation unit 120, and a focus controller 122.

The light source 101 applies a light to the plate 102.

The plate 102 has its bottom made of a transparent and colorless material such as glass or plastic. In this embodiment, a CCD camera 105 is disposed below the plate 102, and therefore image data photographed by the CCD camera 105 is a transmitted light of an observation target on the plate 102.

The photographing unit 100 photographs the transmitted light by applying the light to the observation target on the plate 102 from the light source 101, and comprises an objective lens unit 103 for performing zooming and focusing, a condenser lens 104 for collecting the light transmitted through the objective lens unit 103, the CCD camera 105 for photographing the transmitted light generated by applying the light to the observation target on the plate 102 from the light source 101, and a focus motor 106 for moving the position of the objective lens unit 103.

The camera controller 107 controls the CCD camera 105.

The memory controller 108 controls the memory 109.

The memory 109 stores image data photographed by the CCD camera 105.

The index value operation unit 120 operates to obtain an index value indicating focus information for the observation target from the image data. The index value operation unit 120 comprises a background color operation unit 110 for obtaining background color information from the image data, a threshold value operation unit 111 for obtaining a threshold value for the image data from the background color information, a clip unit 112 for subjecting the image data to clipping processing using the threshold value, a high-pass filter 113 for extracting high-frequency component of the image data from the output signal from the clip unit 112, and an operation unit 121 for performing operation to obtain an index value. Then, the background color operation unit 110 includes a histogram creation unit for creating a histogram of the image data, and outputs an image intensity corresponding to the largest value in the histogram as background color information. Further, the operation unit 121 comprises a rectifier 114 for rectifying the output signal from the high-pass filter 113, and an integrator 115 for subjecting the output signal from the rectifier 114 to integration operation processing to obtain an index value. Then, the integration operation performed by the integrator 115 is to obtain an average value of all the pixels in one image on the basis of the output signal from the rectifier 114 to set the obtained average value as an index value. Further, the index value becomes larger as the focusing is improved.

The focus controller 122 controls the focus of the photographing unit 100 so as to obtain an optimal focus position for the observation target on the basis of the index value obtained by the index value operation unit 120. The focus controller 122 comprises a movement amount and movement direction determination unit 116 for judging what position is an optimal focus position on the basis of the index value obtained by the index value operation unit 120, thereby to determine the amount of movement and the direction of movement of the objective lens unit 103, and a mechanical controller 117 for controlling the focus motor 106 on the basis of the output from the movement amount and movement direction determination unit 116.

Hereinafter, an operation performed in the automatic focusing method which is realized by the above-described construction will be illustrated as an example. Here, a range to be searched for the focus position and the precision (step) for the searching are previously set to 100 μm and 10 μm, respectively. Further, the observation target which is placed on the plate 102 is of a predetermined size and larger than a noise mixed into the image data.

At the start of the automatic focusing operation, the position of the objective lens unit 103 is initially moved downward by 50 μm which corresponds to half the value of the set range to be searched for the focus position. Then, the light source 101 is lit up and applies a light to the plate 102 on which the observation target is placed. The light applied to the plate 102 is transmitted and multiplied by a predetermined magnification by the objective lens unit 103. The light transmitted through the objective lens unit 103 passes through the condenser lens 104 to be focused onto the CCD element in the CCD camera 105. The image focused onto the CCD element in the CCD camera 105 is stored as image data in the memory 109 through the camera controller 107 and the memory controller 108, and an index value A is later calculated from the image data stored in the memory 109. A method for calculating the index value will be described later.

When receiving the calculated index value A, the movement amount and movement direction determination unit 116 outputs the value of the amount of movement corresponding to the previously set step 10 μm and the value of the direction of the movement corresponding to the upward direction to the mechanical controller 117, and the mechanical controller 117 outputs a signal indicating the amount of movement and the direction of movement to the focus motor 106, which moves the objective lens unit 103 into position. Then, the upward direction indicates a direction for making the objective lens unit 103 move closer to the plate 102 while the downward direction indicates a direction for making the objective lens unit 103 move farther away from the plate 102.

Thereafter, the moved position of the objective lens unit 103 is moved upward by another step 10 μm, the CCD camera 105 performs photographing, and an index value B is calculated from the photographed image in the same method as described above. This is sequentially repeated to calculate index values C, D and E. Here, the number of times of photographing by means of the CCD camera 105 is 11 times since the range to be searched for the focus position and the step for the searching are previously set to 100 μm and 10 μm, respectively.

When photographing by means of the CCD camera 105 for the 11 times is completed, the movement amount and movement direction determination unit 116 judges the position of the objective lens unit 103 corresponding to the largest index value of the index values for the 11 times to be an optimal focus position, and outputs a signal indicating the amount and the direction of movement to the mechanical controller 117 so as to move the objective lens unit 103 to the position. The mechanical controller 117 moves the objective lens unit 103 into position and the automatic focusing operation is completed.

Hereinafter, an operation for obtaining an index value with the index value operation unit 120 will be described in detail with reference to FIGS. 2(a)–2(e).

Initially, the image photographed by the CCD camera 105 is stored as image data in the memory 109 through the camera controller 107 and the memory controller 108. For example, in a case where a photographed image is as shown in FIG. 2(a), the image shown in FIG. 2(a) has portions in which dust as well as the observation target are darker than the background. The intensity of the image data on the scanning line at this time is as shown in FIG. 2(b), and in a case where dust are sufficiently smaller than the observation target, the transmitted light of the dust are lighter than the transmitted light of the observation target due to the influence of the diffraction light. Therefore, there is a difference in intensity level between the observation target and the dust. Accordingly, the influence of the dust can be reduced by utilizing the difference in the intensity level.

The background color operation unit 110 obtains the background color from the image data as follows.

Figure 3A:
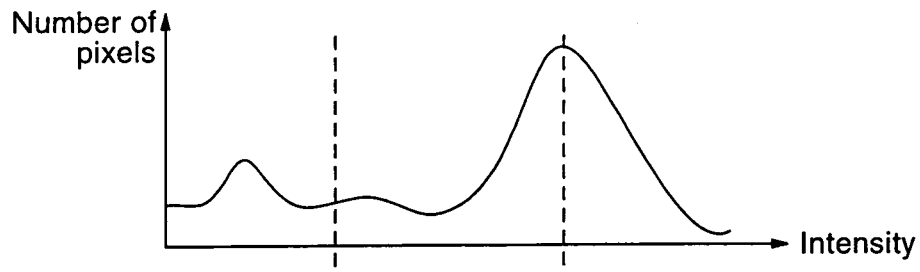
Figure 3B:
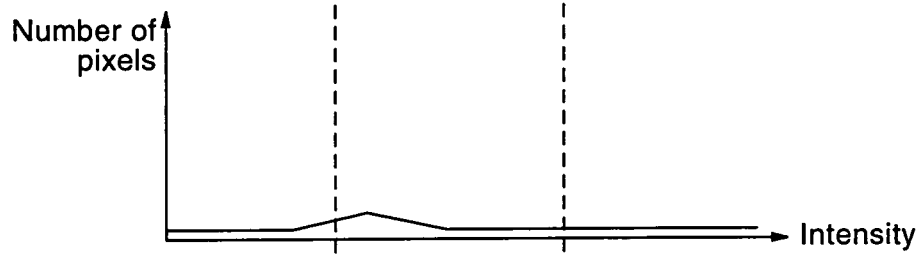
Figure 3C:
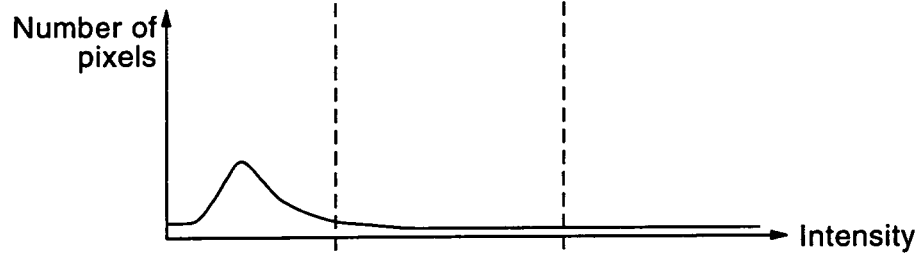
Figure 3D:
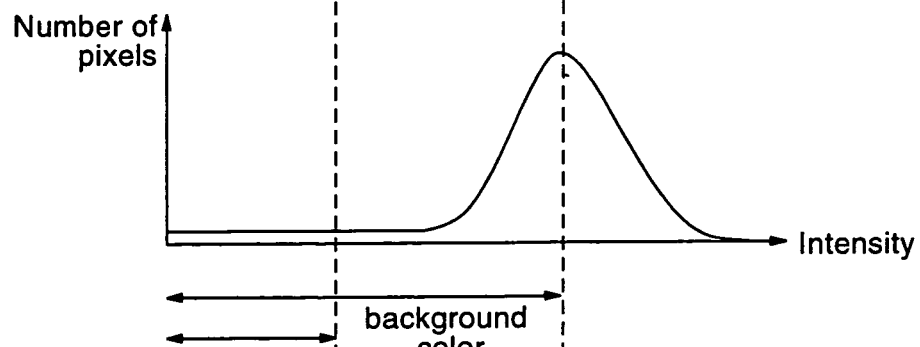

Initially, the background color operation unit 110 creates a histogram of the image photographed by the CCD camera 105 and sets an image intensity value indicated as the largest value by the histogram as the background color. This is because the background color in the image data occupies a larger area than the observation target, the dust and the like, and therefore has the largest number of pixels. Describing this with reference to FIGS. 3(a)–3(d), for example, in a case where the histogram of the image is as shown in FIG. 3(a), the histogram can be considered as a result of composition of the components of the dust as shown in FIG. 3(b), the components of the observation target as shown in FIG. 3(c), and the components of the background as shown in FIG. 3(d). That is, the background has the largest number of pixels in the image, and therefore the image intensity indicated as the largest value by the histogram of the image can be judged as the background color.

The background color so obtained is input to the threshold value operation unit 111. The components of the dust smaller than the observation target are lighter than the observation target under the influence of the diffraction light, and therefore the threshold value operation unit 111 sets, to the threshold value, a value obtained by applying an arbitrary ratio n to the background color obtained from the histogram. A specific method for calculating the ratio n of the threshold value to the background color will be described later.

The clip unit 112 performs clipping processing using the threshold value obtained by the threshold value operation unit 111 and clips the diagonally shaded portion shown in FIG. 2(c), that is, restricts the intensity of the image data using the threshold value. Therefore, referring to FIG. 3(b), it can be understood that the dust components corresponding to the portion having higher intensity than the threshold value can be substantially reduced.

The output of the clip unit 112 is input to the high-pass filter 113, in which the high-frequency component of the image data is enhanced as shown in FIG. 2(d).

The rectifier 114 constituting the operation unit 121 takes an absolute value of the output signal from the high-pass filter 113. The image data outputted from the rectifier 114 is as shown in FIG. 2(e). Thereby, the component which is enhanced by the high-pass filter 113 can be further enhanced, thereby enabling the operation precision to be further improved. Here, while a method in which an absolute value of the output signal from the high-pass filter 113 is taken is employed as a rectification method performed by the rectifier 114, a method in which the output signal from the high-pass filter 113 is squared to be outputted may be employed.

The output signal from the rectifier 114 is input to the integrator 115, in which the output signal is subjected to integration operation processing to obtain an index value.

For the index value obtained as described above, the influence of the dust is effectively reduced, thereby reducing the possibility that the dust may be in focus.

Next, a method for setting a threshold value for reducing the influence of the dust will be described in detail.

As described above, while the component of the dust can be increasingly clipped as the ratio n of the threshold value to the background color is made smaller, if the ratio n of the threshold value is made too small, the component of the observation target may be substantially clipped, and there is a possibility that a proper focus position cannot be obtained. Accordingly, it is important to make the threshold value as small as possible to clip the components of the dust, as well as obtain a ratio n of the threshold value which does not degrade the performance while determining to what extent the component of the observation target should be clipped so as not to degrade the performance.

Hereinafter, a method for obtaining a ratio n of the threshold value to the background color will be specifically described.

Initially, a performance of variations which can be allowed for the automatic focusing is determined.

Here, the observation target is a spherical object of a diameter of 10 µm. Further, since the focus position deviates by approximately 80 µm due to a distortion of the plate 102, the range of 100 µm is used as a range to be searched in positioning for automatic focusing. Then, when the spherical observation target is in focus within 3 µm from the center thereof, a proper focus is obtained.

A fresh observation target is placed on a fresh plate 102, a ratio n of the threshold value to the background color is set to, for example, 200%. That is, the threshold value is set to twice the value of the background color, the dust is kept from being contained, and automatic focusing is performed, for example, 100 times, thereby measuring variations in focus position. That a ratio n of the threshold value to the background color is 200% means that a setting is such that clipping is hardly performed using the threshold value. The automatic focusing is performed with no dust being mixed into the observation target and thereby there is no deviation of the focus position due to the influence of the dust, and the variations in focus position can be minimized, for example, can be restricted to about 2.0 µm even when the clipping is not performed, thereby obtaining a proper focus position.

Next, a ratio n of the threshold value to the background color is set to 100%, and the automatic focusing is similarly repeated 100 times, thereby obtaining variations in focus position. Likewise, the ratio n of the threshold value is changed to 90%, 80%, 70%, 60% and 50%, and variations in focus position are obtained for the respective ratios. In a case where when the ratio n is set to a certain setting value or lower, the variations in focus position exceed 3 µm and an error occurs in focusing, it is judged that the components of the observation target are clipped too much using the threshold value. For example, in a case where when the ratio is set to 40%, and the variations in focus position after the automatic focusing are 3.2 μm, it is judged that the performance is not satisfied, and therefore a margin is allowed to determine the ratio n of the threshold value as 50%. By using the ratio n of the threshold value to the background color so determined, the setting is such that the performance is maintained, as well as the influence of the dust can be reduced as much as possible.

Next, an experiment for checking whether the determined ratio is appropriate or not is made.

The plate 102 having the observation target thereon is left in a space containing dust for a few days, for example, 2 days so that the plate 102 contains dust, and then the experiment is started. Initially, the ratio n of the threshold value is set to 200%, automatic focusing is performed 100 times with no clipping being performed, and it is checked whether an error occurs due to the dust being in focus. In a case where no occurrence of the error can be confirmed, the plate 102 is left as it is for another long period so that dust are naturally mixed or otherwise the expected dust are artificially mixed onto the plate 102, and an error in focusing may be made to occur.

In a case where the occurrence of an error can be confirmed, the ratio n of the threshold value is set to 50% which is the determined ratio, the automatic focusing is performed 100 times, and it is checked that a proper focus can be obtained without the dust being in focus. In this way, a ratio of the threshold value for satisfying the given performance as well as for reducing an error in automatic focusing due to the dust can be obtained through the experiment. Once the ratio is obtained, it may remain unchanged until the observation target or the CCD camera 105 is changed.

Figure 5A:
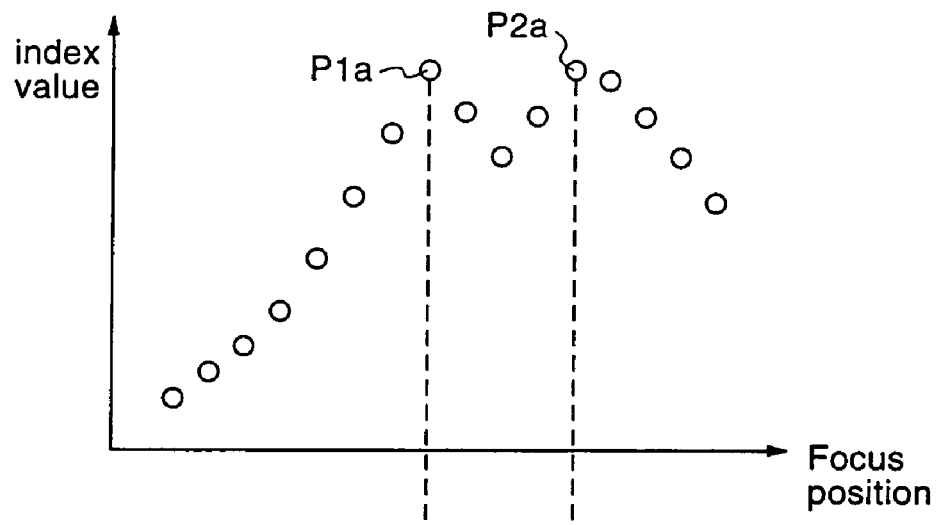
Figure 5B:
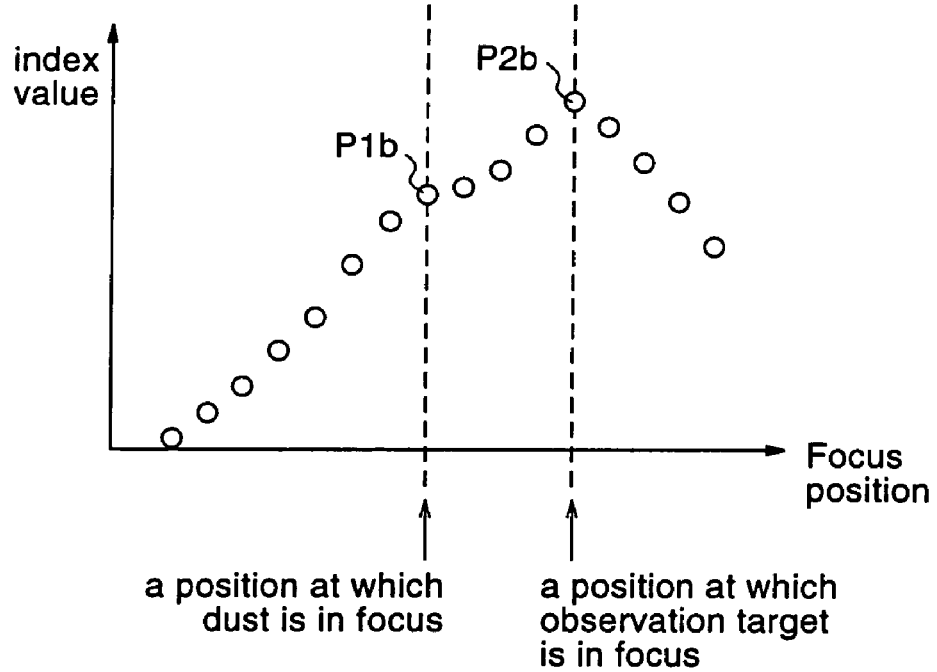

Next, an effect of the clipping by means of the clip unit 112 will be described with reference to FIGS. 5(*a*) and 5(*b*) and 6(*a*) and (*b*). FIGS. 5(*a*) and 5(*b*) illustrate examples of graphs showing the changes in index value with respect to the changes in focus position in a case where the restriction made by the clip unit 112 is applied and in a case where it is not applied.

In a case where the restriction made by the clip unit 112 is not applied, as shown in FIG. 5(*a*), both the index value P1*a* at the position where the dust is in focus and the index value P2*a* at the position where the observation target is in focus have high values and there is no difference therebetween. Accordingly, there is a possibility that the focus controller 122 at the later stage erroneously performs focus control using the value of the index value P1*a* and focuses on the dust.

On the other hand, in a case where the restriction made by the clip unit 112 is applied, as shown in FIG. 5(*b*), the index value P1*b* at the position where the dust is in focus is not a large value, and the focus controller 122 at the later stage can perform proper focus control using the index value P2*b*, thereby preventing the dust from being erroneously brought into focus.

Further, a description will be given with reference to FIGS. 6(*a*) and 6(*b*). FIGS. 6(*a*) and 6(*b*) show a change in focus position corresponding to a change in distance between the objective lens unit and the plate, in which FIG. 6(*a*) shows a state in which the position of the objective lens 103*a* which constitutes the objective lens unit 103 is positioned at P1 and the dust is in focus, while FIG. 6(*b*) shows a state in which the position of the objective lens 103*a* which constitutes the objective lens unit 103 is positioned at P2 and the observation target is in focus.

As shown in FIG. 6(*a*), in a case where the position of the objective lens 103*a* is positioned at P1, the result obtained by adding the high-frequency component of the dust in focus and the high-frequency component of the observation target which is out of focus is an index value at the position P1. The index value corresponds to P1*a* shown in FIG. 5(*a*) in a case where no clipping is performed while the index value corresponds to P1*b* shown in FIG. 5(*b*) in a case where the clipping is performed.

On the other hand, as shown in FIG. 6(*b*), in a case where the position of the objective lens 103*a* is positioned at P2, the result obtained by adding the high-frequency component of the dust which is out of focus and the high-frequency component of the observation target in focus is an index value at the position P2. The index value corresponds to P2*a* shown in FIG. 5(*a*) in a case where no clipping is performed while the index value corresponds to P2*b* shown in FIG. 5(*b*) in a case where the clipping is performed.

As described above, when the clipping is performed, the optimal focus position can be obtained with no influence of the dust.

The automatic focusing apparatus according to the first embodiment as described above comprises the index value operation unit 120 which obtains a threshold value from the background color of the photographed image data, performs clipping processing using the threshold value, and operates to obtain an index value from the image data which is subjected to the clipping processing, and the focus controller 122 which automatically controls the focus of the photographing unit 100 on the basis of the index value, and thereby the automatic focusing apparatus discriminates between the observation target and the dust and prevents the dust from being erroneously brought into focus even in a state where the observation target and the dust are mixedly present, thereby enabling the observation target to be properly brought into focus.

Then, while in the first embodiment the background color operation unit 110 is provided with a histogram creation unit for creating a histogram of the image data, and outputs the image intensity corresponding to the largest value in the created histogram as background color information, the background color may be obtained as follows.

For example, the background color operation unit 110 may be provided with a largest value operation unit for setting the largest value of the image intensities of all the pixels in the image data to the background color information. In this case, a pixel indicating a value which is larger in image intensity is judged as background, and the background color of the image data can be obtained on the basis of the judgement result. This is because the background is a result of photographing light which does not transmit through the observation target and the dust, and the background is lighter since the background does not transmit through the observation target and the dust. However, when only the largest value is judged as the background color of the image data, there is a possibility that the intensity of the background color may be erroneously obtained due to the influence of noise such as a defective pixel of the CCD element. Therefore, when the background color is determined with the N-th largest value in image intensity (N is an arbitrary value) or a value obtained by averaging N pieces of image intensities from the largest value up to the N-th largest value in image intensity, the intensity of the background color can be prevented from being erroneously detected due to dark current noise of the CCD element and the like.

Further, the background color operation unit 110 may be provided with an average value operation unit which sets an average value of the image intensities of all the pixels in the image data as background color information. In this case, when a larger number of pixels are occupied by the background than the observation target and the dust as described above, an average value of the image intensities of all the pixels can be obtained as the background color. However, it must be considered that in a case where there are a lot of observation targets and dust, the average value is smaller (darker) as compared to the other case. Thereby, an erroneous detection due to the non-uniformity of the intensities of the background colors can be prevented.

Figure 4A:
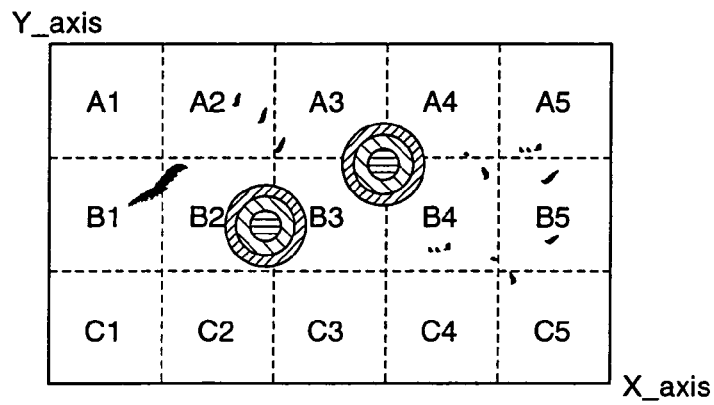
Figure 4B:
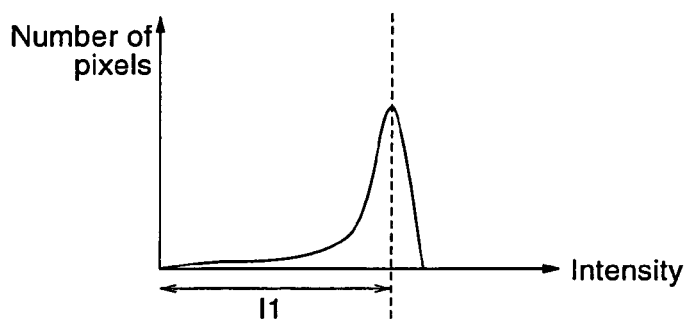
Figure 4C:
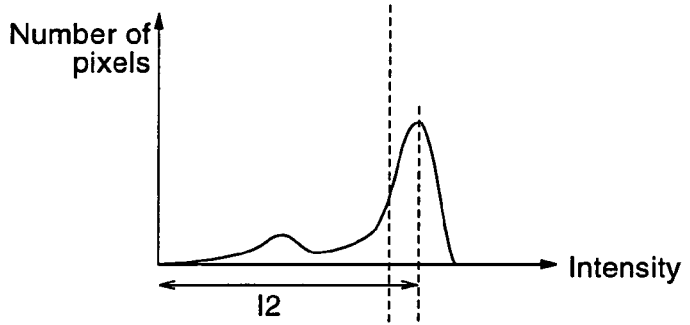
Figure 4D:
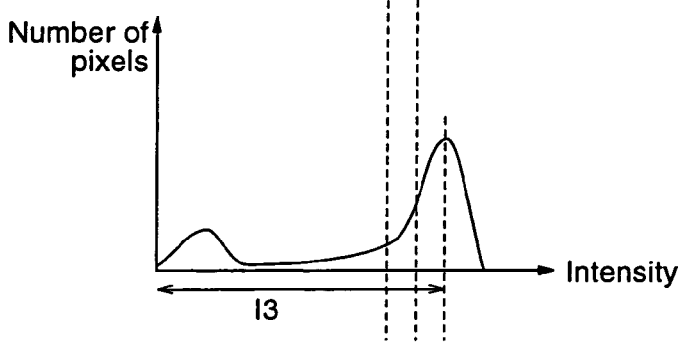

Further, the background color operation unit 110 may be provided with an area-specific histogram creation unit which divides the image into a plurality of areas and creates a histogram for each area. For example, the image is divided into 15 areas of A1 to A5, B1 to B5, and C1 to C5 as shown in FIG. 4(a) and a histogram is created for each area. Then, the image intensity corresponding to the largest value in the histogram for each area is obtained as a background color for each area. To be specific, in a case where the histograms for the areas A1, A2, and B3 are as shown in FIGS. 4 (b) to 4(d), respectively, the intensities I1 to I3 corresponding to the largest values in the histograms for the respective areas are set to background colors for the respective areas A1, A2, and B3, and thereby the non-uniformity of the background colors can be coped with. Then, in a case where the light source 101 lacks uniformity of the luminances in a field of view on the plate 102, the brightness of the background colors are also different in the field of view. The normal light source has a higher luminance at the center of the optical axis, and has a lower luminance farther away from the center thereof, and therefore when the center of the optical axis is aligned with the center of the field of view to be disposed at the same position, the luminance is higher at the center of the field of view and lower at the corner of the field of view. Then, when the image is divided into a plurality of areas to obtain background color information for each area, the surfaces of the background colors corresponding to the respective visual field positions can be appropriately obtained.

Moreover, the background color operation unit 110 may be provided with an area-specific largest value operation unit which divides the image into a plurality of areas as shown in FIG. 4(a) to obtain the largest value of the image intensities for each area. In this case, the largest value of the image intensities for each area can be obtained as background color information for each area, and thereby an appropriate background color surface can be obtained with no influence of the non-uniformity of background colors. When the smallest image intensity value among the plurality of the largest values of the image intensities which are obtained by the area-specific largest value operation unit is outputted as background color information for the whole image data, the background color information which is less influenced by the non-uniformity of the background colors can be obtained.

Further, the background color operation unit 110 may be provided with an area-specific average value operation unit which divides the image into a plurality of areas as shown in FIG. 4(a) to obtain an average value of the image intensities for each area. In this case, an average value of the image intensities for each area can be obtained as background color information for each area, and thereby an appropriate background color surface can be obtained with no influence of the non-uniformity of the background colors at the respective visual field positions.

Then, the automatic focusing apparatus according to the first embodiment is applicable to all the apparatus for performing automatic focusing using a transmitted light such as a microscope and a microfilm scanner.

Embodiment 2

Figure 7:
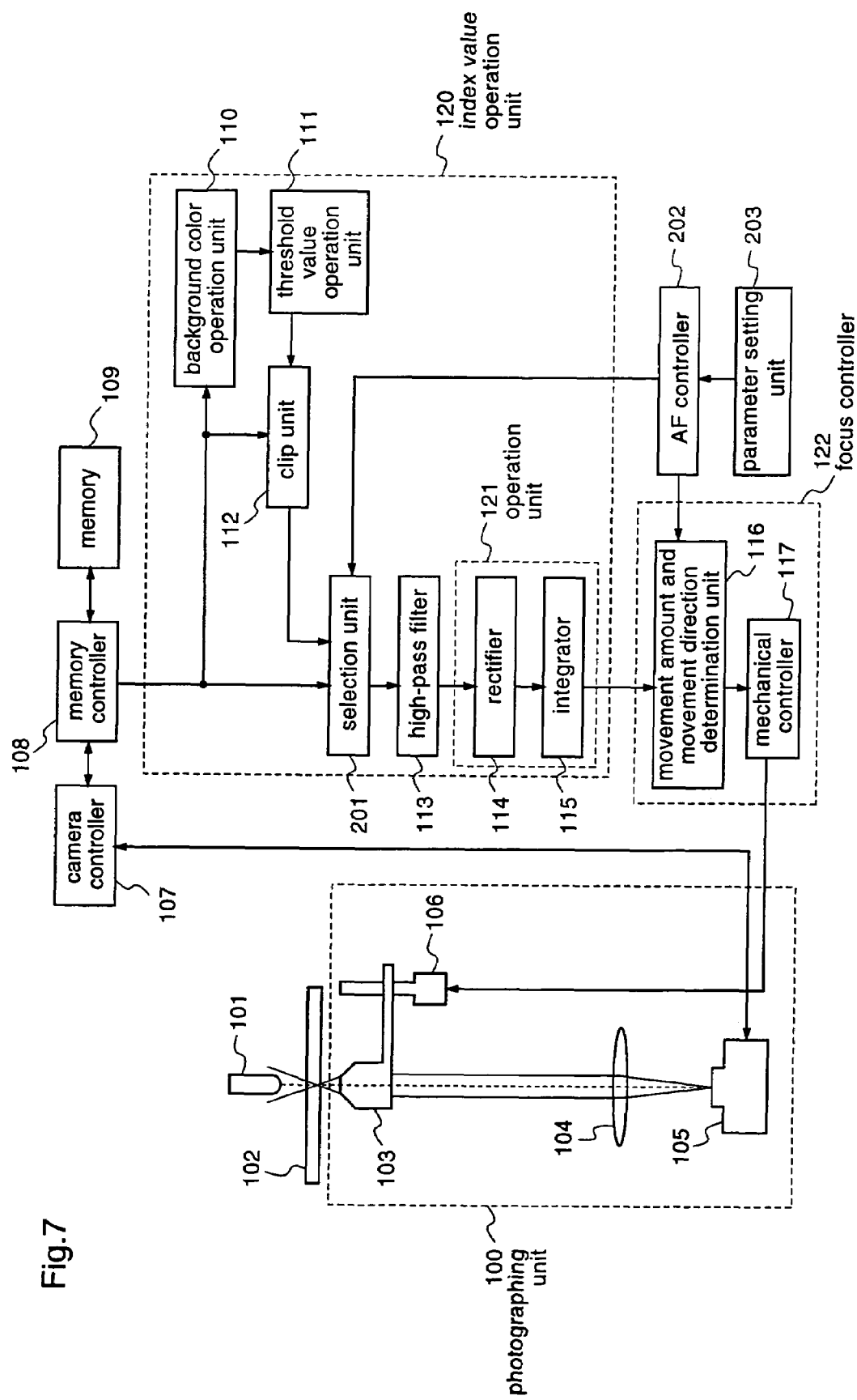
FIG. 7 is a diagram illustrating a construction of an automatic focusing apparatus according to a second embodiment of the present invention.

FIG. 7 is a diagram illustrating a construction of an automatic focusing apparatus according to a second embodiment of the present invention. Then, in FIG. 7, the same constituents as those shown in FIG. 1 are denoted by the same reference numerals and the description thereof is omitted.

The automatic focusing apparatus according to the second embodiment is provided with a selection unit 201, an auto-focus (hereinafter, abbreviated as AF) controller 202, and a parameter setting unit 203, in addition to the constituents of the automatic focusing apparatus according to the first embodiment. Then, in the second embodiment, the focus controller 122 has 2 stages of focus control modes of fine adjustment and coarse adjustment.

When the focus controller 122 makes the fine adjustment, the selection unit 201 selects an output from the clip unit 112, that is, image data which is subjected to clipping processing, and when the focus controller 122 makes the coarse adjustment, the selection unit 201 selects an output from the memory controller 108, that is, image data which is not subjected to clipping processing, and outputs the selected one.

The AF controller 202 transmits the direction of movement and the amount of movement of the focus position to the movement amount and movement direction determination unit 116 on the basis of the set parameter as well as controls the selection unit 201.

A range to be searched, steps and the like are externally set in the parameter setting unit 203.

Hereinafter, an automatic focusing method according to the second embodiment will be described with reference to FIGS. 8(a) and 8(b).

Figure 8A:
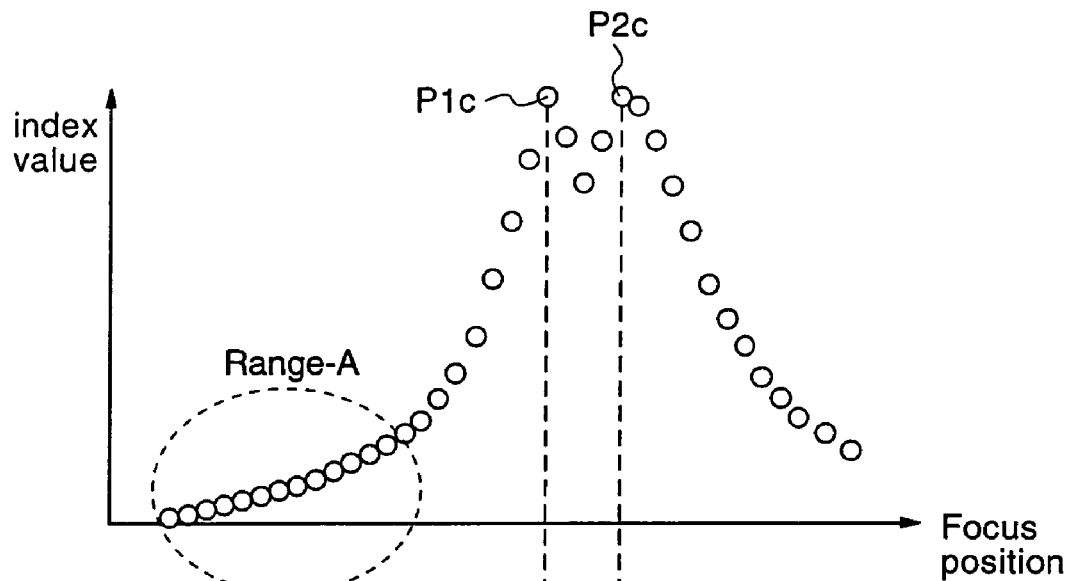
Figure 8B:
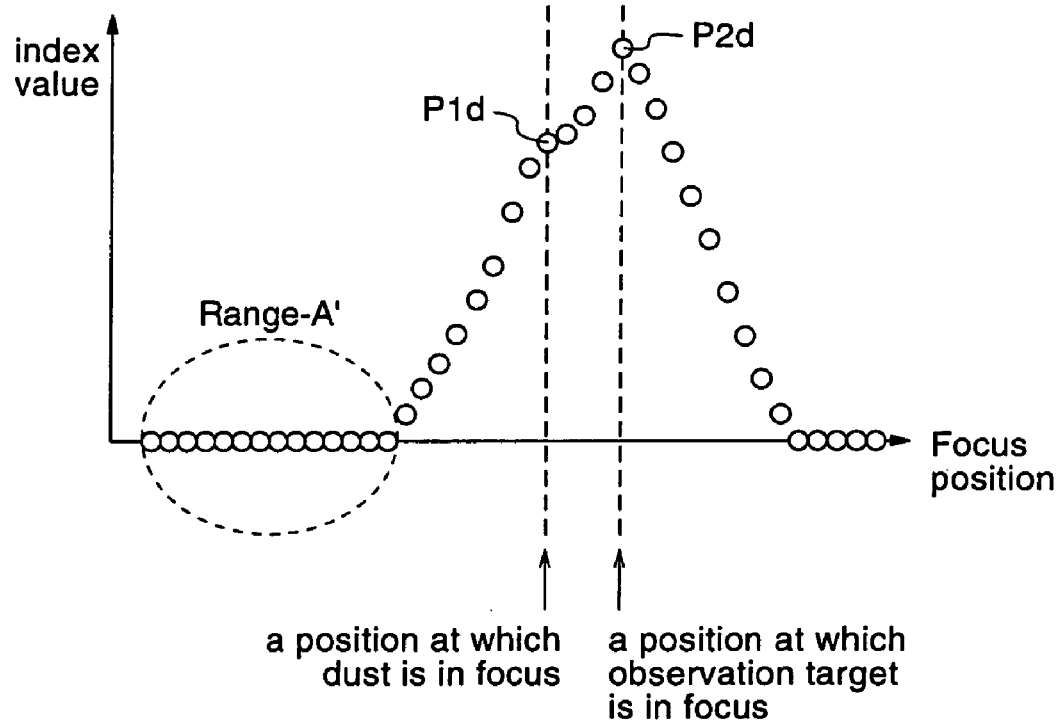
Figure 9:
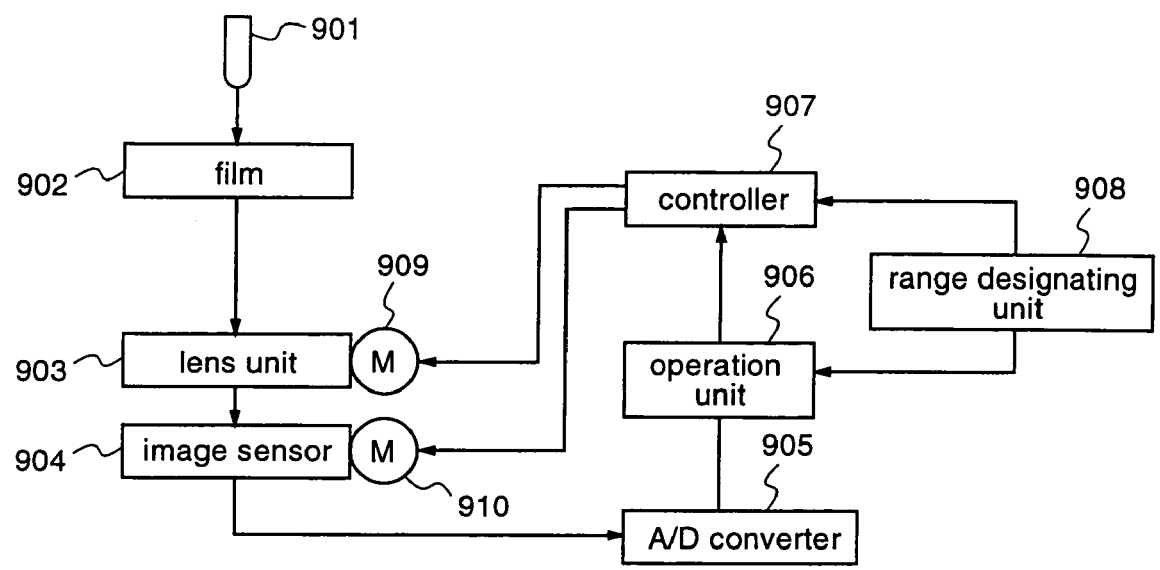
FIG. 9 is a diagram illustrating a construction of a prior art automatic focusing apparatus.

FIGS. 8(a) and 8(b) show a relationship between index values and focus positions in a case where the objective lens is positioned away from the observation target to some extent, in which FIG. 8(a) shows a case where there is dust and no clipping is performed while FIG. 8(b) shows a case where there is dust and the clipping is performed. In FIGS. 8(a) and 8(b), P1c and P1d each indicate an index value corresponding to a position where the dust is in focus while P2c and p2d each indicate an index value corresponding to a position where the observation target is in focus.

Initially, the transitions of the index values in the case of performing no clipping and in the case of performing clipping are observed, respectively. It can be seen that the transition of the index values in a range of Range-A shown in FIG. 8(a) indicates a gradual rightward increase while the index values in a range of Range-A' shown in FIG. 8(b) remains almost zero. This indicates that when the focus position is being shifted from the observation target, the timing at which the observation target no longer appears is earlier in a case where the clipping is performed.

Generally, when a lens is focused on an object to be observed, a range of focused focal points at which the object is in focus is called the depth of focus, and in a range in which the focus position deviates from the depth of focus, the observation target is out of focus. For example, in a case where a silhouette is observed, it can be seen that the silhouette is darker when the silhouette is in focus while the silhouette is lighter when the focus deviates from the depth of focus. Accordingly, as the focus position deviates from the depth of focus and the silhouette of the observation target becomes lighter, the timing at which the observation target no longer appears becomes earlier in a case where the clipping is performed as compared to a case where no clipping is performed.

Further, in a case where the clipping is performed, when only the index values in a range of Range-A' shown in FIG. 8(b) are seen, the values are not different from each other and therefore it is not clear in what direction the peak of the index values appears, and it cannot be seen whether an optimal focus position is present or not. As a result, a focused position cannot be properly determined. In a case where no clipping is performed, however, when the index values in a range of Range-A shown in FIG. 8(a) are seen, it can be assumed from the transition of the index values that the peak of the index values appears in the upper right direction in FIG. 8(a), that is, an optimal focus position is present. Accordingly, when a wide range is searched for a position close to the observation target, the clipping may not be performed so that more information can be obtained and a vicinity of the optimal focus position which is a peak of the index values can be searched earlier.

From the above, the automatic focusing processing is divided into 2 stages of coarse adjustment and fine adjustment, and no clipping is performed at the coarse adjustment and the clipping is performed at the fine adjustment, thereby enabling an optimal focus position to be searched at higher speed and with higher precision.

The automatic focusing method according to the second embodiment will be described in detail. Here, in the case of coarse adjustment, the focus position is moved from the current focus position 10 µm by 10 µm in a range of ±100 µm, an index value is calculated at each focus position, and the focus position is moved close to the observation target. In the case of fine adjustment, the focus position is moved 1 µm by 1 µm in a range of ±10 µm from the focus position which has been moved by the execution of the coarse adjustment, an index value is calculated at each focus position, and the focus position is moved to an optimal focus position. Further, the focus controller 122 makes coarse adjustment and then makes fine adjustment.

Initially, at the start of the automatic focusing operation, a range to be searched, step and the like are set in the parameter setting unit 203. The AF controller 202 transmits the direction of movement and the amount of movement of the focus position based on the set parameter to the movement amount and movement direction determination unit 116.

Next, the objective lens unit 103 is moved downward by 100 µm which corresponds to half the range to be searched which is set for coarse adjustment through the mechanical controller 117 and the focus motor 106. Then, the light source 101 is lit up, and the image at the position is photographed by the CCD camera 105. The photographed image is stored as image data in the memory 109 through the camera controller 107 and the memory controller 108.

The background color operation unit 110 operates to obtain the background color from the image data stored in the memory 109. The threshold value operation unit 111 operates to obtain a threshold value corresponding to the background color on the basis of the obtained background color. The threshold value is input to the clip unit 112, and the image data is restricted using the threshold value.

In the second embodiment, the setting is such that the coarse adjustment is made and then the fine adjustment is made and therefore the focus control for making coarse adjustment will be initially described.

In the case of the coarse adjustment, the selection unit 201 selects the image data which is not subjected to clipping processing, and the image data is input to the integrator 115 through the high-pass filter 113 and the rectifier 114 to perform operation for obtaining an index value. The movement amount and movement direction determination unit 116 stores the index value and outputs information relating to the amount of movement and the direction of movement to the mechanical controller 117 so as to move the objective lens unit 103 by one more step. Here, the information indicating that the amount of movement is 10 µm and the direction of movement is an upward direction is output, and the mechanical controller 117 outputs, to the focus motor 106, a signal for executing the movement based on the information relating to the amount of movement and the direction of movement so that the objective lens unit 103 is moved by the focus motor 106. This operation is repeated and the index values are stored, and all the operations for obtaining the index values in the set range to be searched are completed, and then the movement amount and movement direction determination unit 116 eventually determines where to move the objective lens unit 103.

The value of the index value obtained as described above gradually becomes larger after the start of the automatic focusing operation, and peaks at a proper focused position, and becomes smaller after the peak is passed. However, in a case where the index value continues to increase until the last photographing, that is, until the automatic focusing operation is completed, the movement amount and movement direction determination unit 116 judges that an error occurs and stops the automatic focusing operation, and shifts the position of the objective lens unit 103 upward, for example, by 150 µm and executes the automatic focusing operation again. This is because the increase in index value indicates that the searched range does not contain a position at which the observation target is in focus while a position at which the observation target is in focus is more likely to be in the upward direction. Conversely, when the index value continues to decrease to the end, a position at which the observation target is in focus is more likely to be in the downward direction. Further, when the index value increases halfway and then decreases, the focus position corresponding to the largest index value is close to a position at which the observation target is in focus.

When the vicinity of the focus position for the observation target can be identified through the coarse adjustment as described above, the objective lens unit 103 is moved close to the focus position to start the fine adjustment.

In the case of fine adjustment, the selection unit 201 selects image data which is subjected to clipping processing, and the automatic focusing is performed using the method as described in the first embodiment.

The automatic focusing apparatus according to the second embodiment as described above comprises the selection unit 201 for selecting one of the output from the clip unit 112 and the output from the memory controller 108, the AF controller 202 for controlling the selection unit 201 and the focus controller 122, and the parameter setting unit 203 in addition to the constituents of the automatic focusing apparatus according to the first embodiment, wherein in the automatic focusing operation using the transmitted light, the photographing unit 100 is focused on the vicinity of the position at which the observation target is in focus at the coarse adjustment in which no clipping is performed, and thereafter the observation target is properly brought into focus at the fine adjustment in which the clipping is performed, thereby enabling the automatic focusing operation to be performed for the observation target at higher speed and with higher precision.

Then, while in the second embodiment the automatic focusing operation is divided into two stages of the coarse adjustment and the fine adjustment to be performed, the automatic focusing operation may be divided into three stages of coarse adjustment, normal adjustment, and fine adjustment, or more stages, to be performed. A method for performing operation on the basis of the image data which is not subjected to clipping processing by the clip unit 112 is employed in the case of coarse adjustment, a method for setting a range to be searched narrower and a step more precise as compared to the case of the coarse adjustment and performing operation on the basis of the image data which is subjected to clipping processing by the clip unit 112 is employed in the case of normal adjustment, and a method for setting a range to be searched narrower and a step more precise as compared to the case of the normal adjustment and performing operation on the basis of the image data which is subjected to clipping processing by the clip unit 112 is employed in the case of fine adjustment.

Further, while in the second embodiment the automatic focusing operation in which the range to be searched and the step are set is described, a so-called "hill-climbing method" may be employed, and the automatic focusing operation is not restricted to that described in the second embodiment.

Moreover, the automatic focusing apparatus according to the second embodiment is applicable to all the apparatuses for performing automatic focusing using the transmitted light such as a microscope and a microfilm scanner.

The automatic focusing apparatus and automatic focusing method according to the present invention have an automatic focusing unit for properly bringing the observation target into focus in a case where the observation target, the dust and the like are mixedly present, and are applicable to an observation apparatus such as a microscope requiring automatic focusing.

What is claimed is:

1. An automatic focusing apparatus comprising:
   a light source for applying a light to an observation target;
   a photographing unit for photographing a transmitted light generated by the light being applied to the observation target from the light source and outputting the photographed light as image data;
   an index value operation unit for obtaining background color information from the image data outputted from the photographing unit and obtaining an index value indicating focus information for the observation target on the basis of the background color information; and
   a focus controller for controlling a focus of the photographing unit so as to obtain an optimal focus position for the observation target on the basis of the index value, wherein
   the index value operation unit comprises:
   a background color operation unit for obtaining the background color information from the image data;
   a threshold value operation unit for obtaining a threshold value for the image data on the basis of the background color information;
   a clip unit for subjecting the image data to clipping processing using the threshold value;
   a high-pass filter for extracting high frequency components of the image data from an output signal of the clip unit; and
   an operation unit for obtaining the index value on the basis of an output signal of the high-pass filter.

2. The automatic focusing apparatus as defined in claim 1, wherein
   the background color operation unit
   includes a histogram creation unit for creating a histogram of the image data, and is operable to output
   an image intensity value corresponding to a largest value in the histogram as the background color information.

3. The automatic focusing apparatus as defined in claim 1, wherein
   the background color operation unit
   includes a largest value operation unit for obtaining a largest value of image intensities of the image data, and is operable to output
   the largest value of the image intensities obtained by the largest value operation unit as the background color information.

4. The automatic focusing apparatus as defined in claim 1, wherein
   the background color operation unit
   includes an average value operation unit for obtaining an average value of image intensities of the image data, and is operable to output
   the average value of the image intensities obtained by the average value operation unit as the background color information.

5. The automatic focusing apparatus as defined in claim 1, wherein
   the background color operation unit
   includes an area-specific histogram creation unit for dividing the image data into a plurality of areas and creating a histogram for each area, and is operable to output an
   image intensity value corresponding to a largest value in the histogram for each area as the background color information for each area.

6. The automatic focusing apparatus as defined in claim 1, wherein
   the background color operation unit
   includes an area-specific largest value operation unit for dividing the image data into a plurality of areas and obtaining a largest value of image intensities for each area, and is operable to output
   the largest value of the image intensities for each area, which is obtained by the area-specific largest value operation unit, as the background color information for each area.

7. The automatic focusing apparatus as defined in claim 1, wherein
   the background color operation unit includes an area-specific largest value operation unit for dividing the image data into a plurality of areas and obtaining a largest value of image intensities for each area, and is operable to output
   as the background color information, a smallest image intensity value among the plural largest values of the image intensities, which are obtained by the area-specific largest value operation unit.

8. The automatic focusing apparatus as defined in claim 1, wherein
   the background color operation unit
   includes an area-specific average value operation unit for dividing the image data into a plurality of areas and obtaining an average value of the image intensities for each area, and is operable to output the average value of the image intensities for each area, which is obtained by the area-specific average value operation unit, as the background color information for each area.

9. The automatic focusing apparatus as defined in claim 1, wherein
the observation target is of a predetermined size that is larger than any noise mixed into the image data.

10. An automatic focusing apparatus comprising:
a light source for applying a light to an observation target;
a photographing unit for photographing a transmitted light generated by the light being applied to the observation target from the light source and outputting the photographed light as image data;
an index value operation unit for obtaining background color information from the image data outputted from the photographing unit and obtaining an index value indicating focus information for the observation target on the basis of the background color information; and
a focus controller for controlling a focus of the photographing unit so as to obtain an optimal focus position for the observation target on the basis of the index value, wherein
the index value operation unit comprises:
a background color operation unit for obtaining the background color information from the image data;
a threshold value operation unit for obtaining a threshold value for the image data on the basis of the background color information;
a clip unit for subjecting the image data to clipping processing using the threshold value;
a selection unit for selecting one of the image data and the clipping processed image data from the clip unit and outputting the selected image data;
a high-pass filter for extracting high frequency components of the selected image data from an output signal of the selection unit; and
an operation unit for obtaining the index value on the basis of an output signal of the high-pass filter.

11. The automatic focusing apparatus as defined in claim 10, wherein
the focus controller has at least two stages of focus control modes of coarse adjustment and fine adjustment, and
the selection unit is operable to select
the image data when the focus controller makes the coarse adjustment, and select the clipping processed image data from the clip unit when the focus controller makes the fine adjustment.

12. The automatic focusing apparatus as defined in claim 10, wherein
the focus controller is operable to make the coarse adjustment and then make the fine adjustment.

13. The automatic focusing apparatus as defined in claim 10, wherein
the observation target is of a predetermined size that is larger than any noise mixed into the image data.

14. An automatic focusing method for photographing a transmitted light generated by applying a light to an observation target using a photographing element and focusing the photographing element on the basis of image data obtained from the photographed image, the automatic focusing method comprising:
obtaining background color information from the image data;
obtaining a threshold value for the image data on the basis of the background color information;
subjecting the image data to clipping processing using the threshold value;
extracting high frequency components of the clipping processed image data;
obtaining an index value indicating focus information for the observation target on the basis of the extracted high frequency components; and
controlling a focus of the photographing element so as to obtain an optimal focus position for the observation target on the basis of the index value.

15. An automatic focusing method for photographing a transmitted light generated by applying a light to an observation target using a photographing element and focusing the photographing element on the basis of image data obtained from the photographed image, the automatic focusing method comprising:
obtaining background color information from the image data;
obtaining a threshold value for the image data on the basis of the background color information;
subjecting the image data to clipping processing using the threshold value;
selecting the image data when a coarse adjustment is made for focusing the photographing element and selecting the clipping processed image data when a fine adjustment is made for focusing the photographing element, as selected image data;
extracting high frequency components of the selected image data;
obtaining an index value indicating focus information for the observation target on the basis of the high frequency components; and
controlling a focus of the photographing element so as to obtain an optimal focus position for the observation target on the basis of the index value.

* * * * *